United States Patent
Kozakai et al.

(10) Patent No.: US 11,063,635 B2
(45) Date of Patent: Jul. 13, 2021

(54) DEVICE AND SYSTEM FOR POWER TRANSMISSION

(71) Applicant: SONY CORPORATION, Tokyo (JP)

(72) Inventors: Osamu Kozakai, Kanagawa (JP); Takaaki Hashiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/545,234

(22) Filed: Aug. 20, 2019

(65) Prior Publication Data

US 2019/0379424 A1 Dec. 12, 2019

Related U.S. Application Data

(63) Continuation of application No. 15/652,576, filed on Jul. 18, 2017, now Pat. No. 10,530,425, which is a
(Continued)

(30) Foreign Application Priority Data

Sep. 12, 2011 (JP) .................. 2011-197865

(51) Int. Cl.
*H02J 50/60* (2016.01)
*H02J 50/12* (2016.01)
(Continued)

(52) U.S. Cl.
CPC .......... *H04B 5/0037* (2013.01); *A01K 29/00* (2013.01); *H02J 5/005* (2013.01); *H02J 7/025* (2013.01);
(Continued)

(58) Field of Classification Search
CPC .... B60L 5/005; B60L 11/182; B60L 11/1829; H01F 38/14; H02J 5/005; H02J 7/025;
(Continued)

(56) References Cited

U.S. PATENT DOCUMENTS 8,912,685 B2 12/2014 Hashiguchi
2008/0111518 A1 5/2008 Toya
(Continued)

FOREIGN PATENT DOCUMENTS

AU 2008339681 A1 7/2009
AU 2008339692 A1 7/2009
(Continued)

OTHER PUBLICATIONS

Office Action for KR Patent Application No. 10-2019-7004387, dated Apr. 11, 2019, 07 pages of Office Action and 07 pages of English Translation.
(Continued)

*Primary Examiner* — Levi Gannon
(74) *Attorney, Agent, or Firm* — Michael Best & Friedrich LLP

(57) ABSTRACT

A device for power transmission includes a power transmission section and a detection section. The power transmission section is configured to transmit an electric power wirelessly. The detection section is operatively connected to the power transmission section and configured to detect an object within a range from the power transmission section based on a change in impedance in vicinity of the power transmission section.

12 Claims, 12 Drawing Sheets

Related U.S. Application Data continuation of application No. 14/343,737, filed as application No. PCT/JP2012/068546 on Jul. 17, 2012, now Pat. No. 9,729,204.

(51) Int. Cl.
| | | |
|---|---|---|
| *H02J 5/00* | (2016.01) | |
| *H02J 7/04* | (2006.01) | |
| *H04B 5/00* | (2006.01) | |
| *H02J 50/40* | (2016.01) | |
| *H02J 7/02* | (2016.01) | |
| *A01K 29/00* | (2006.01) | |

(52) U.S. Cl.
CPC .............. *H02J 7/045* (2013.01); *H02J 50/12* (2016.02); *H02J 50/40* (2016.02); *H02J 50/60* (2016.02)

(58) Field of Classification Search
CPC .. H02J 7/045; H02J 17/00; H02J 50/10; H02J 50/12; H02J 50/60; H04B 5/0037; H04B 5/0075; H04B 5/0093; Y02T 90/122
USPC ........................................................ 307/104
See application file for complete search history.

(56) References Cited

U.S. PATENT DOCUMENTS

| | | | |
|---|---|---|---|
| 2009/0174364 | A1 | 7/2009 | Onishi et al. |
| 2011/0080051 | A1 | 4/2011 | Lee et al. |
| 2011/0248572 | A1 | 10/2011 | Kozakai et al. |
| 2011/0266880 | A1 | 11/2011 | Kim et al. |
| 2011/0266882 | A1 | 11/2011 | Yamamoto et al. |
| 2011/0285210 | A1 | 11/2011 | Lemmens et al. |
| 2011/0291491 | A1 | 12/2011 | Lemmens et al. |
| 2012/0091989 | A1 | 4/2012 | Uramoto et al. |
| 2012/0091993 | A1 | 4/2012 | Uramoto et al. |
| 2012/0098348 | A1 | 4/2012 | Inque et al. |
| 2012/0146580 | A1 | 6/2012 | Kitamura |
| 2012/0175967 | A1 | 7/2012 | Dibben et al. |
| 2012/0235509 | A1 | 9/2012 | Ueno et al. |
| 2012/0326521 | A1 | 12/2012 | Bauer et al. |
| 2012/0326661 | A1 | 12/2012 | Kada et al. |
| 2012/0326662 | A1 | 12/2012 | Matsumoto et al. |
| 2013/0082647 | A1 | 4/2013 | Yoon et al. |
| 2013/0127254 | A1 | 5/2013 | Miichi et al. |
| 2013/0134931 | A1 | 5/2013 | Tomiki et al. |
| 2013/0154557 | A1 | 6/2013 | Lee et al. |
| 2013/0264887 | A1 | 10/2013 | Arisawa |
| 2014/0015522 | A1 | 1/2014 | Widmer et al. |
| 2014/0333146 | A1 | 11/2014 | Dibben et al. |
| 2015/0054354 | A1 | 2/2015 | Lemmens et al. |

FOREIGN PATENT DOCUMENTS

| | | | |
|---|---|---|---|
| CA | 2709860 A1 | 7/2009 | |
| CA | 2709867 A1 | 7/2009 | |
| CN | 101123015 A | 2/2008 | |
| CN | 101252294 A | 8/2008 | |
| CN | 101436791 A | 5/2009 | |
| CN | 101978571 A | 2/2011 | |
| CN | 101981780 A | 2/2011 | |
| CN | 102457107 A | 5/2012 | |
| CN | 103259344 A | 8/2013 | |
| DE | 202009009693 U1 | 11/2010 | |
| EP | 1022840 A2 | 7/2000 | |
| EP | 2079146 A2 | 7/2009 | |
| EP | 2232668 A1 | 9/2010 | |
| EP | 2238666 A1 | 10/2010 | |
| EP | 2690739 A2 | 1/2014 | |
| HK | 1150903 A1 | 5/2014 | |
| JP | 3179802 B2 | 6/2001 | |
| JP | 2004-096852 A | 3/2004 | |
| JP | 2006-060909 A | 3/2006 | |
| JP | 2008-141816 A | 6/2008 | |
| JP | 2008-141940 A | 6/2008 | |
| JP | 2008-167582 A | 7/2008 | |
| JP | 2009-005426 A | 1/2009 | |
| JP | 2009-112137 A | 5/2009 | |
| JP | 2010-119251 A | 5/2010 | |
| JP | 2011-507481 A | 3/2011 | |
| JP | 2011-507482 A | 3/2011 | |
| JP | 2011-083132 A | 4/2011 | |
| JP | 5426570 B2 | 2/2014 | |
| KR | 10-2008-0032519 A | 4/2008 | |
| KR | 10-2009-0008158 A | 1/2009 | |
| KR | 10-2009-0076838 A | 7/2009 | |
| KR | 10-2010-0094596 A | 8/2010 | |
| KR | 10-2010-0098715 A | 9/2010 | |
| KR | 20100116556 A | 11/2010 | |
| KR | 10-2015-0085095 A | 7/2015 | |
| MY | 154347 A | 5/2015 | |
| RU | 2010129840 A | 1/2012 | |
| RU | 2010129842 A | 1/2012 | |
| TW | 201001866 A | 1/2010 | |
| TW | 201001867 A | 1/2010 | |
| TW | 201607202 A | 2/2016 | |
| WO | 2009/014125 A1 | 1/2009 | |
| WO | 2009/081115 A1 | 7/2009 | |
| WO | 2009/081126 A1 | 7/2009 | |
| WO | 2010/093723 A1 | 8/2010 | |
| WO | 2011/043074 A1 | 4/2011 | |

OTHER PUBLICATIONS

Office Action for EP Patent Application No. 17195420.9, dated Dec. 11, 2018, 04 pages of Office Action.
Office Action for KR Patent Application 10-2014-7004450, dated Jun. 25, 2018, 05 pages of Office Action and 05 pages of English Translation.
Extended European Search Report of EP Patent Application No. 17195420.9 dated Jan. 19, 2018, 06 pages.
Notice of Allowance for U.S. Appl. No. 14/343,737, dated Apr. 12, 2017, 08 pages.
Final office action for U.S. Appl. No. 14/343,737, dated Jan. 31, 2017, 13 pages.
Non-Final office action for U.S. Appl. No. 14/343,737, dated Sep. 28, 2016, 12 pages.
Non-Final office action for U.S. Appl. No. 15/652,576, dated Oct. 4, 2018, 17 pages.
Final office action for U.S. Appl. No. 15/652,576, dated Feb. 15, 2019, 08 pages.
Final office action for U.S. Appl. No. 15/652,576, dated May 23, 2019, 08 pages.
International Search Report and Written Opinion of PCT Application No. PCT/JP2012/068546, dated Oct. 23, 2012, 07 pages of ISRWO.
International Preliminary Report on Patentability of PCT Application No. PCT/JP2012/068546, dated Mar. 20, 2014, 06 pages of IPRP.
Notice of Allowance in U.S. Appl. No. 15/652,576 dated Sep. 3, 2019.
Extended European Search Report dated Feb. 25, 2020 for corresponding European Application No. 19216505.8.
Korean Office Action dated Mar. 20, 2020 for corresponding Korean Application No. 10-2020-7001995.
Chinese Office Action dated Oct. 10, 2020 for corresponding Chinese Application No. 210710531646.6.

[FIG. 1]
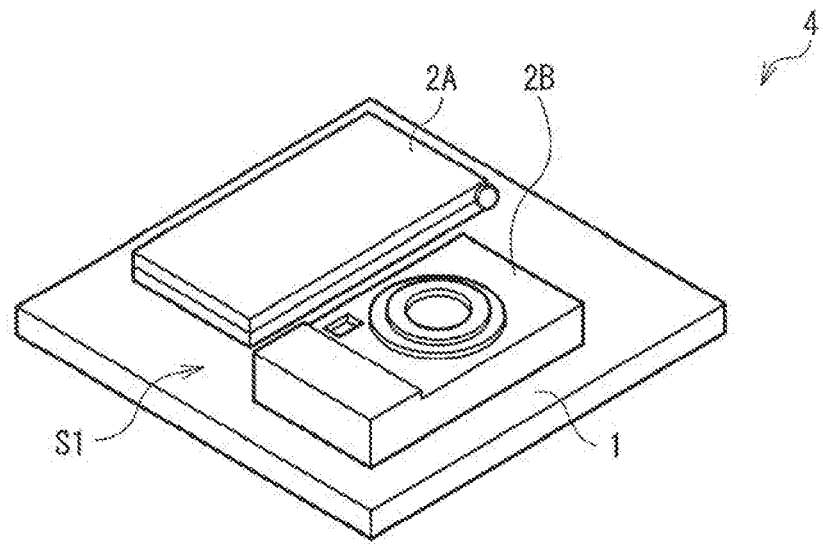
[FIG. 2]
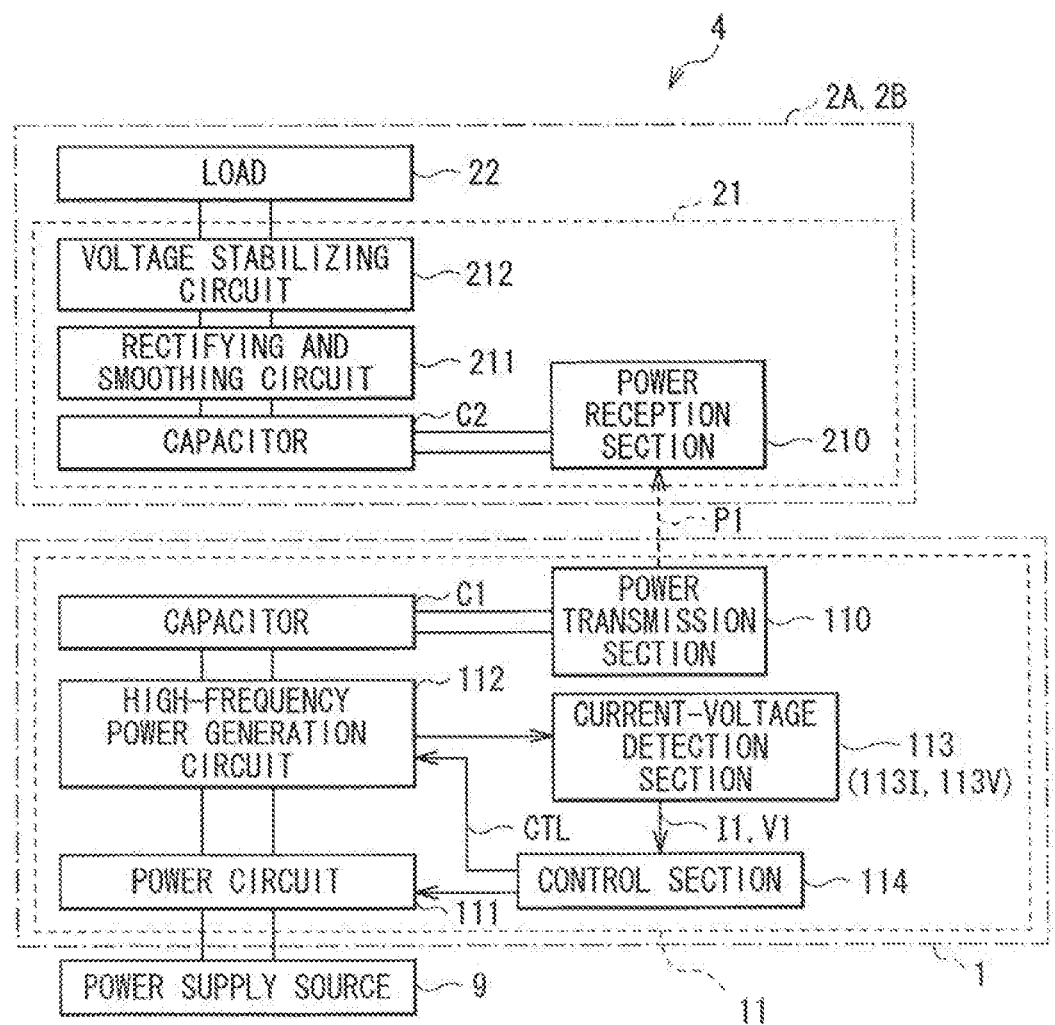

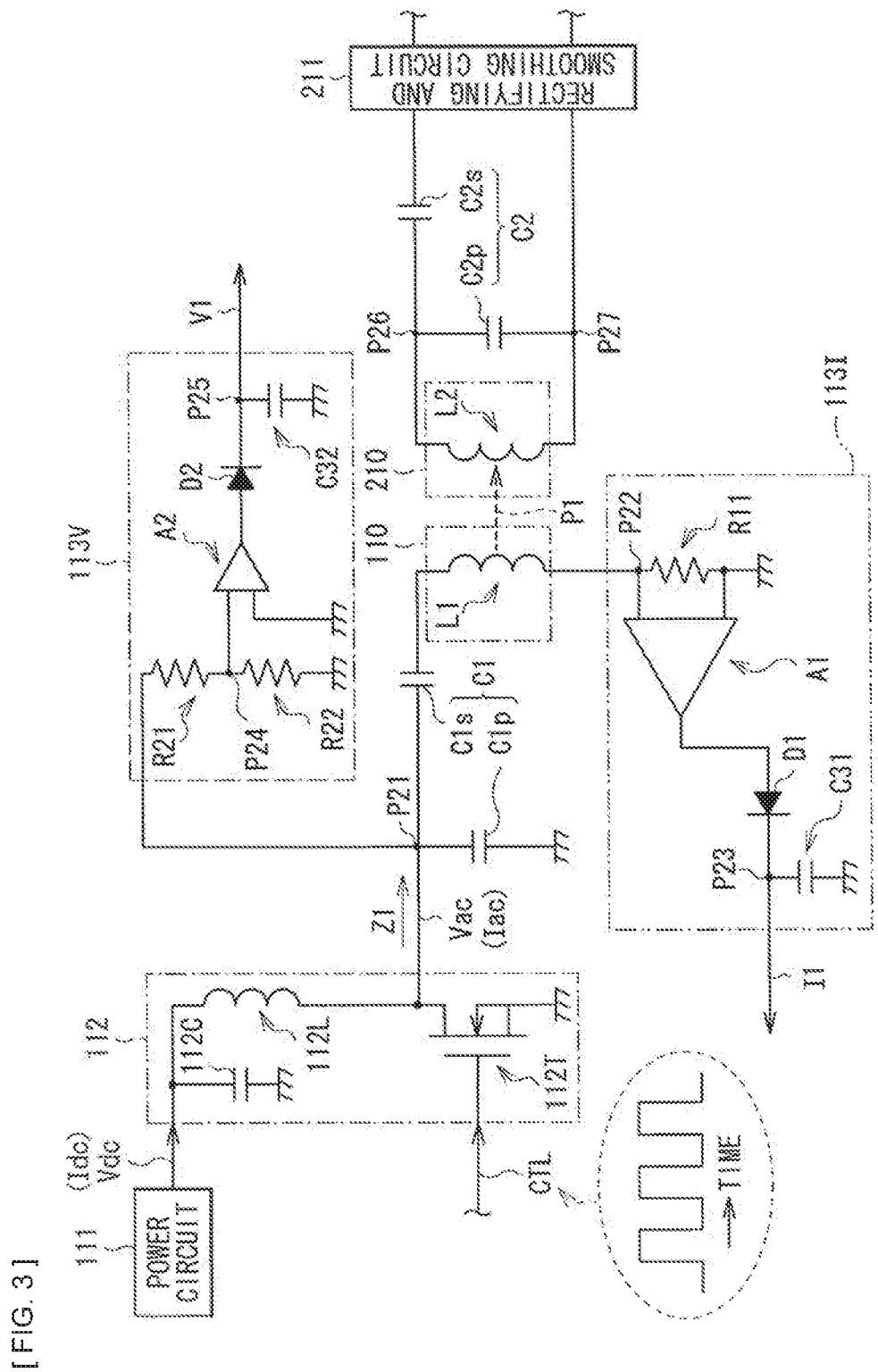
[FIG. 3]

[FIG. 4]
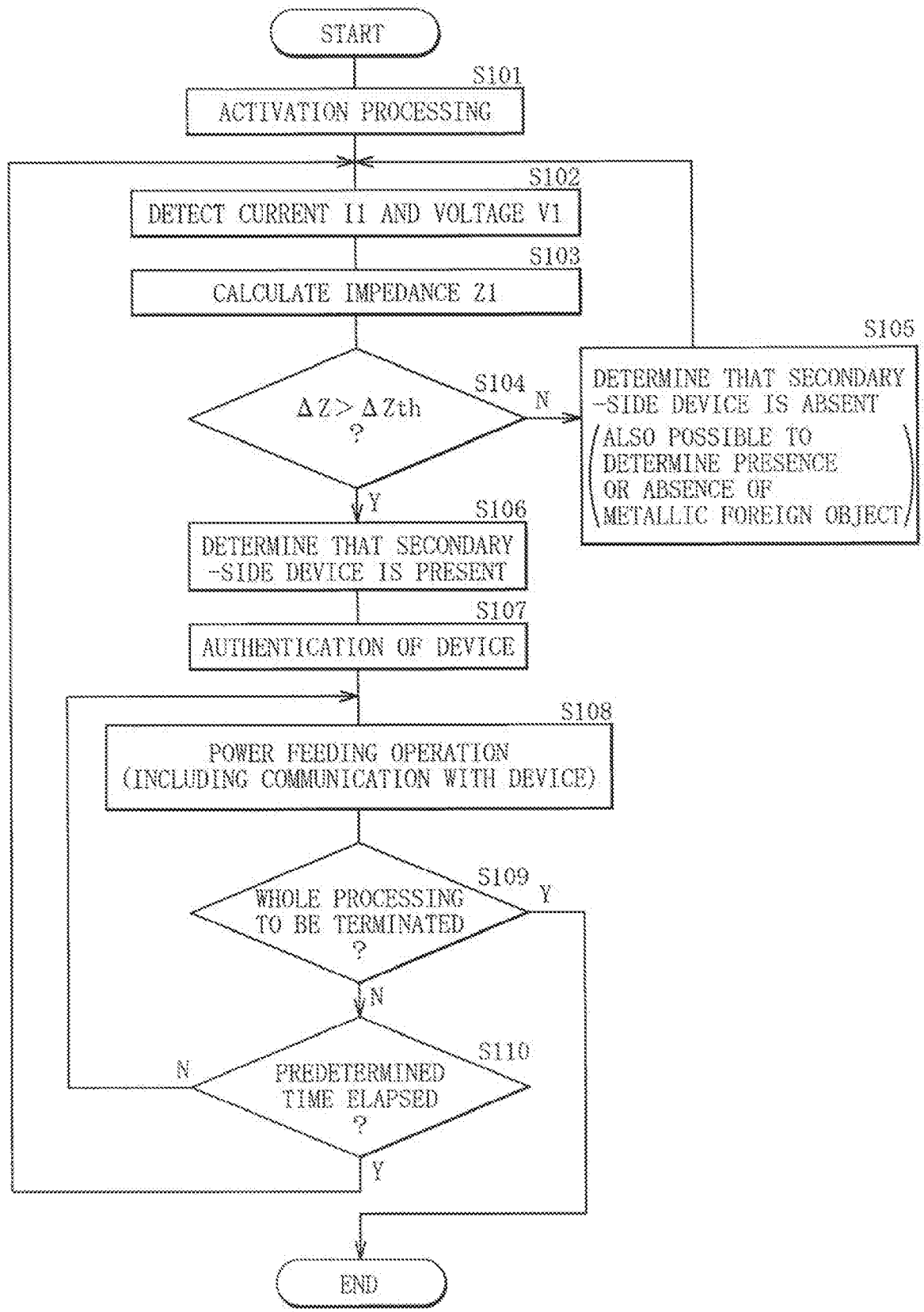

[FIG. 5]
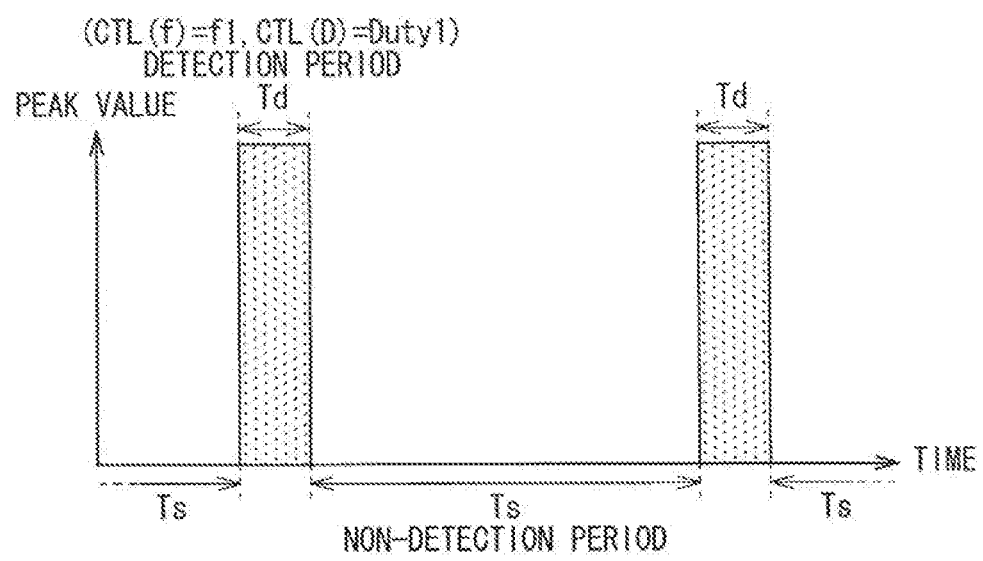

[FIG. 6A]
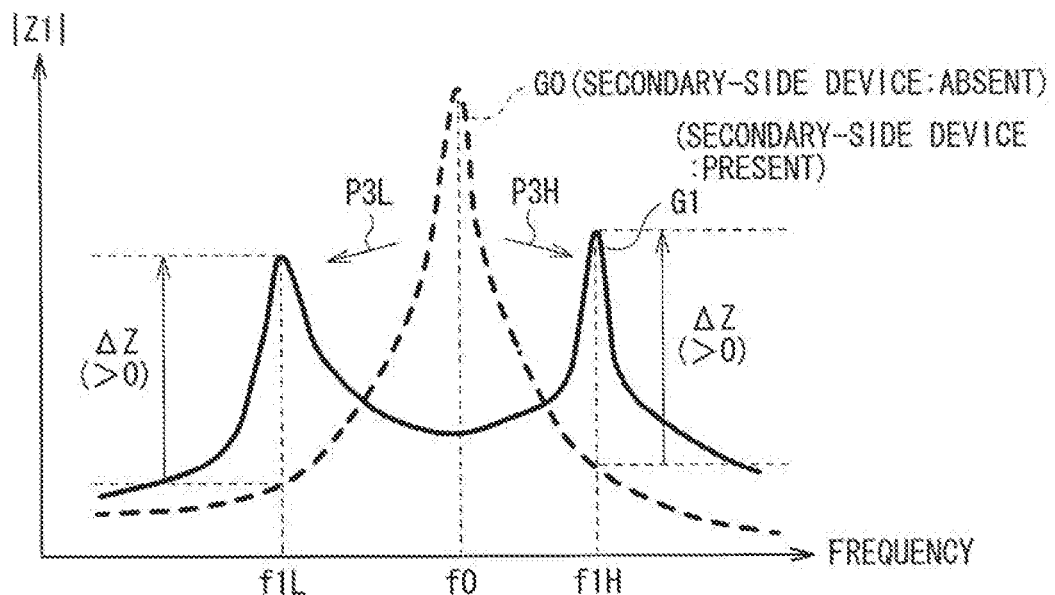
[FIG. 6B]
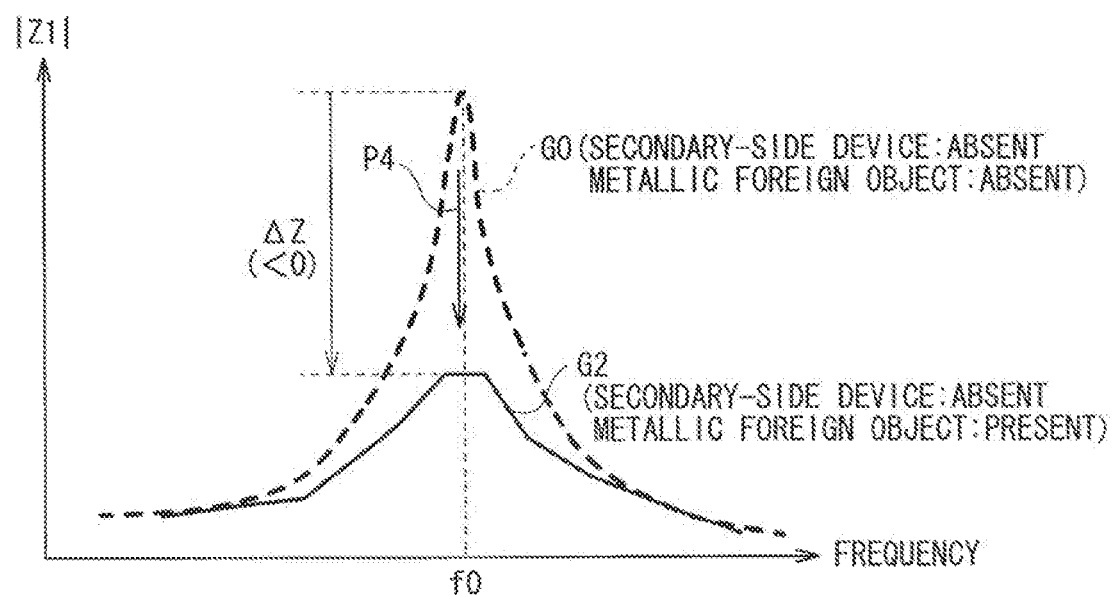

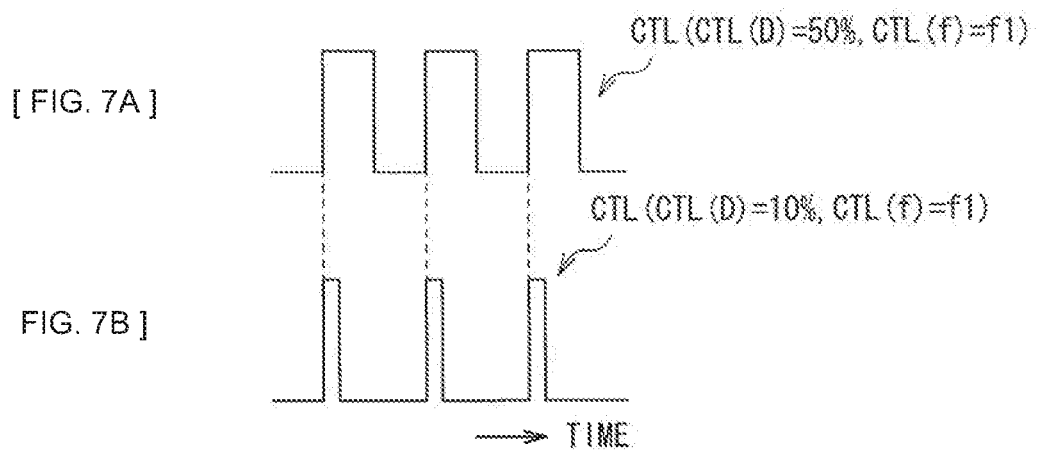
[FIG. 7A]
[FIG. 7B]
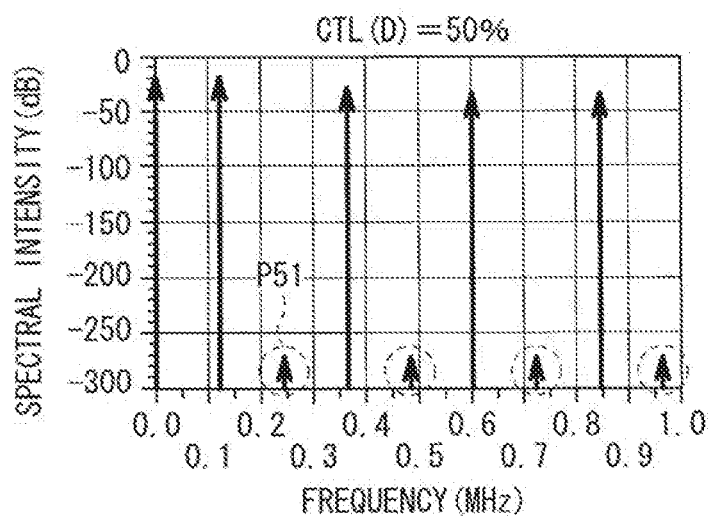
[FIG. 8A]
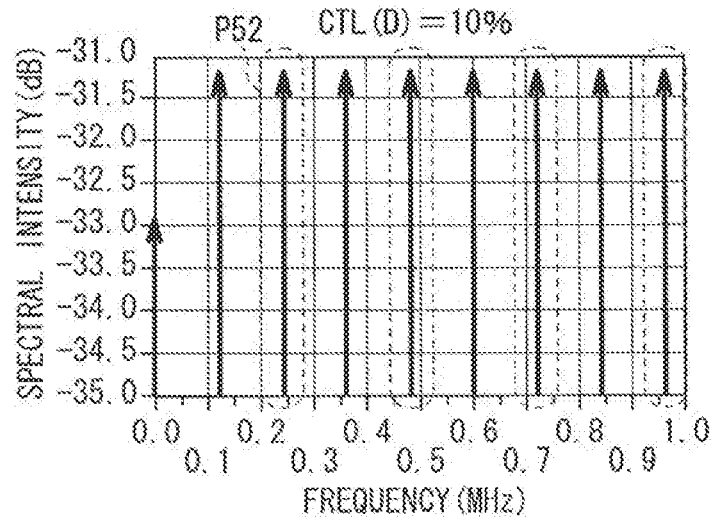
[FIG. 8B]

[FIG. 9]
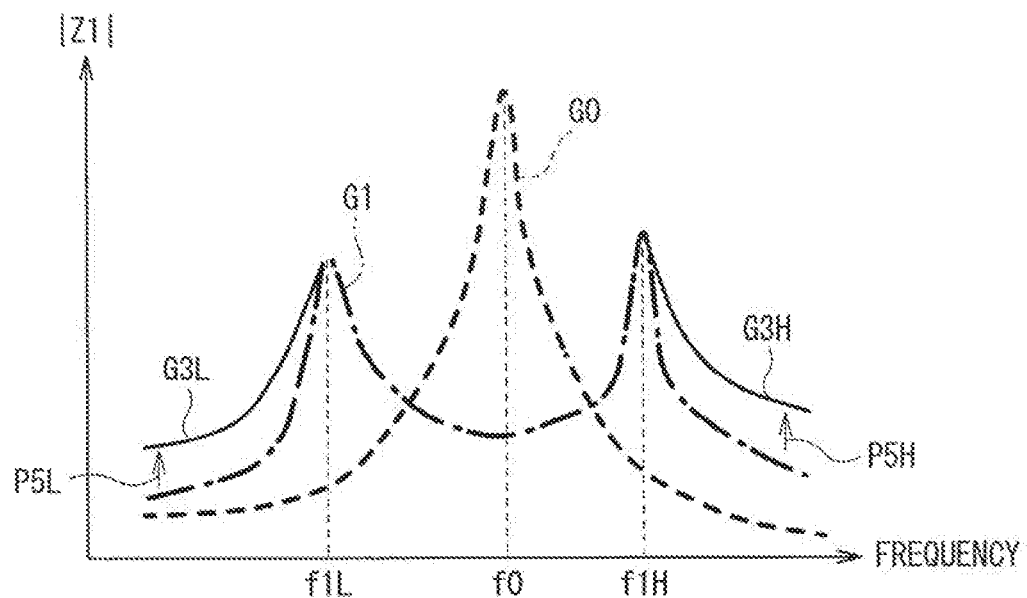
[FIG. 10]
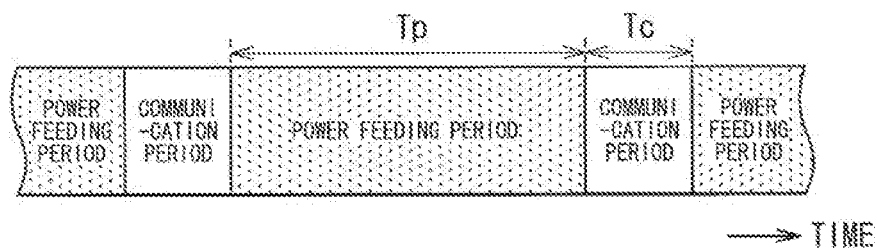

[FIG. 11]
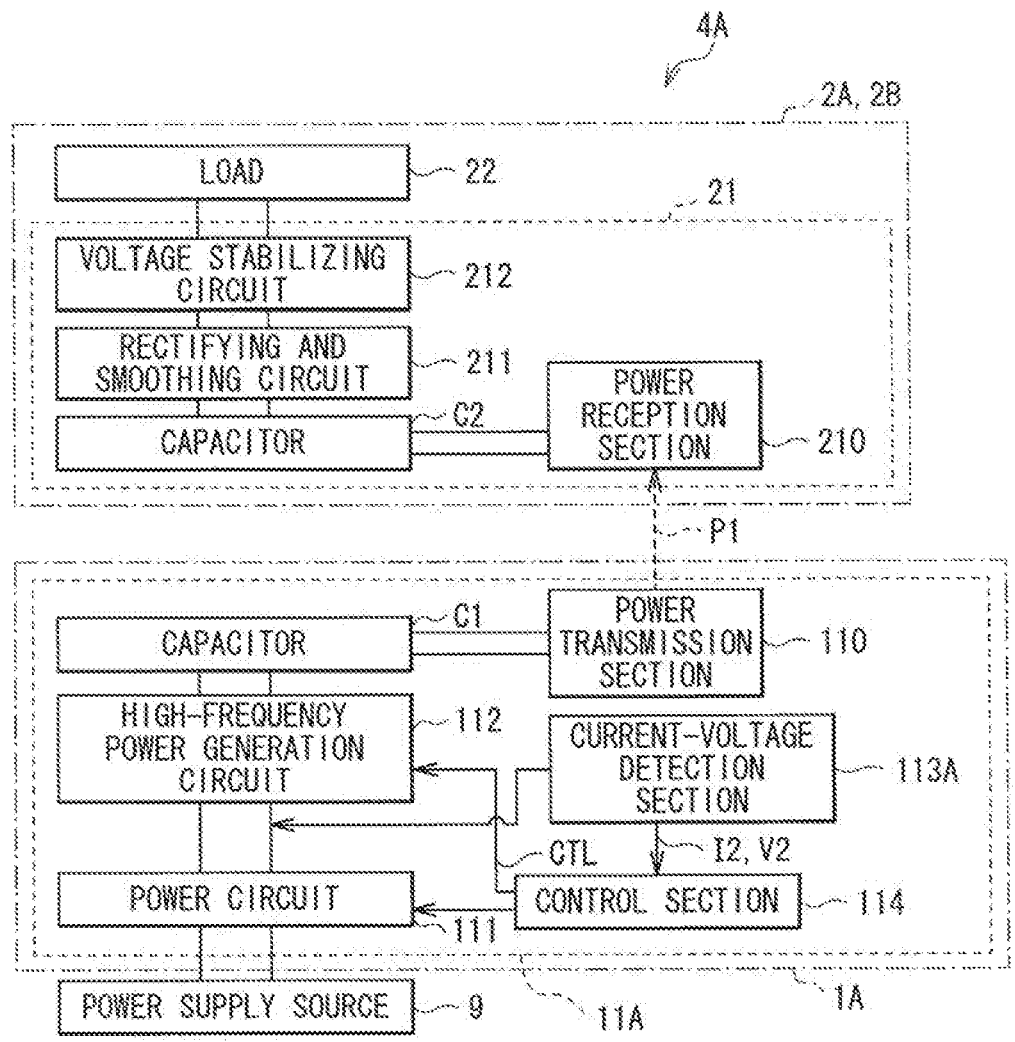

[FIG. 12]
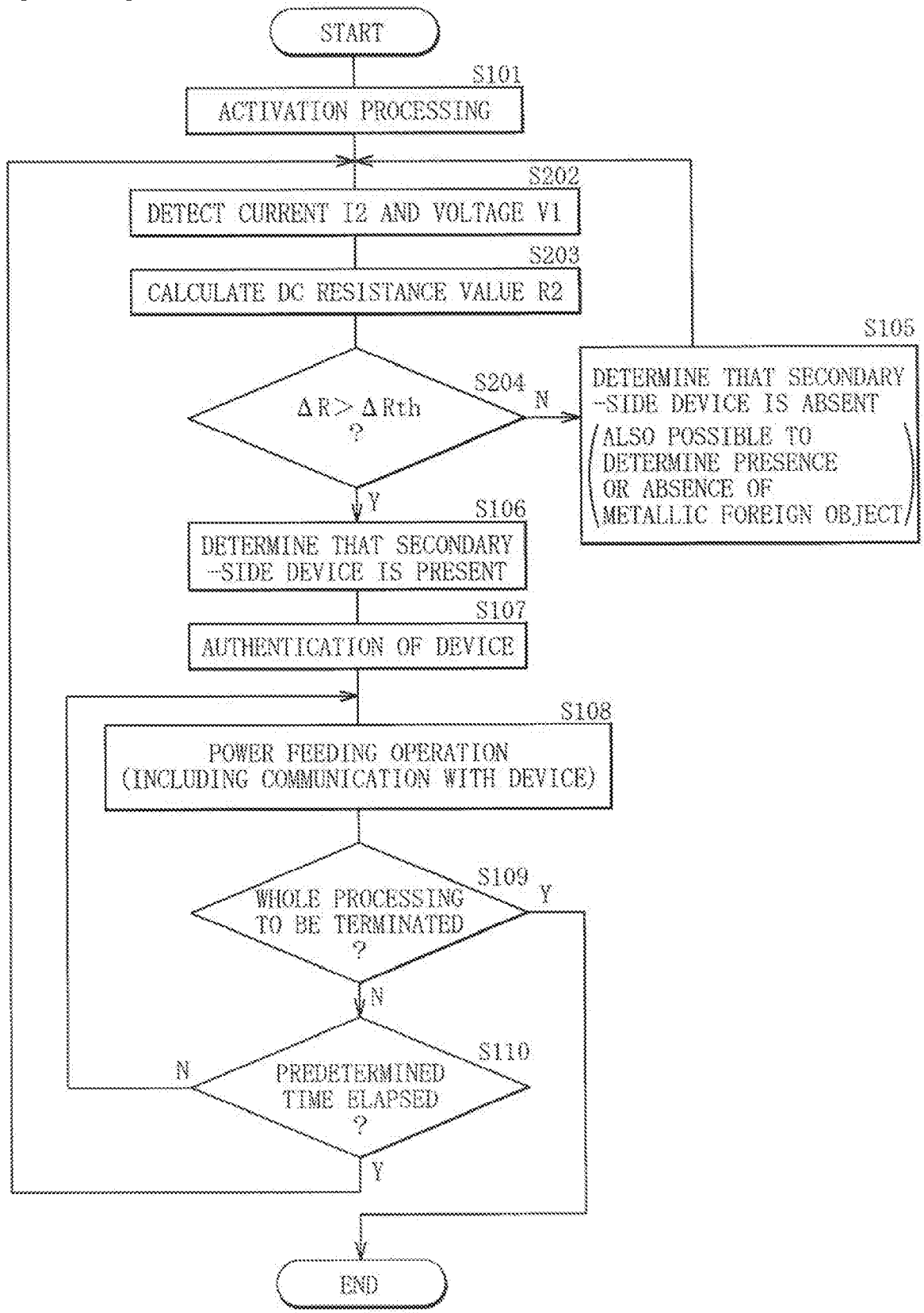

[ FIG. 13A ]
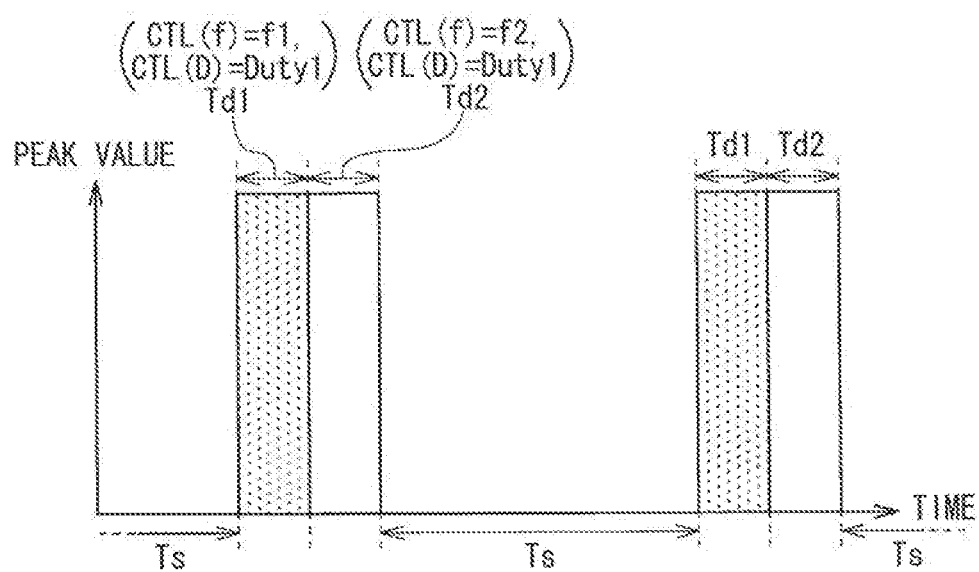
[ FIG. 13B ]
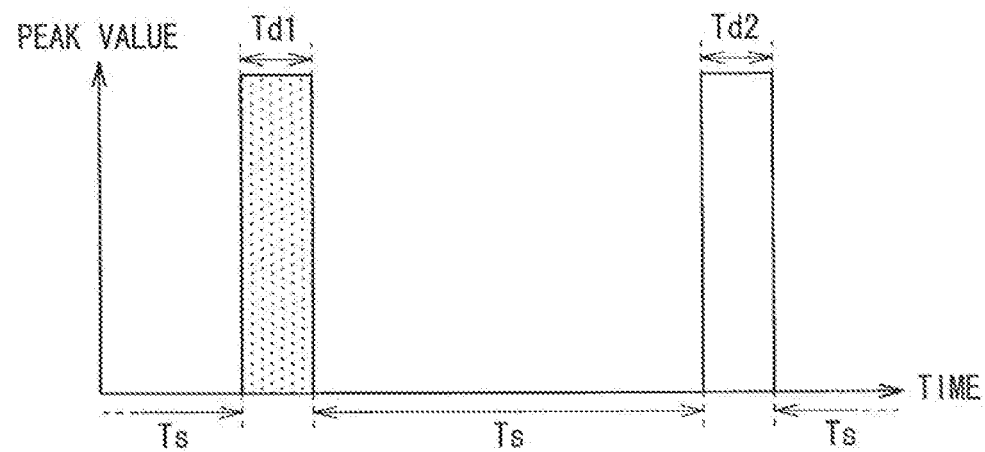

[FIG. 14A]
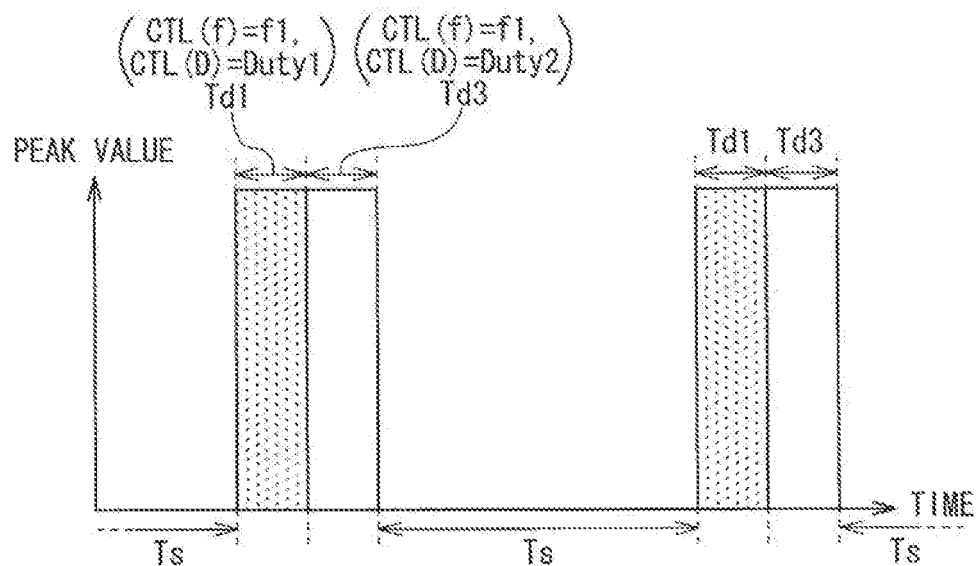
[FIG. 14B]
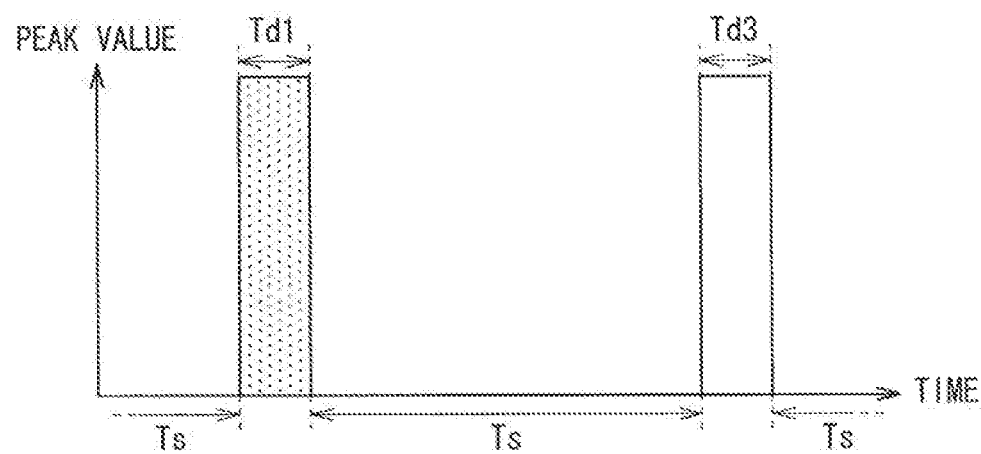

[ FIG. 15A ]
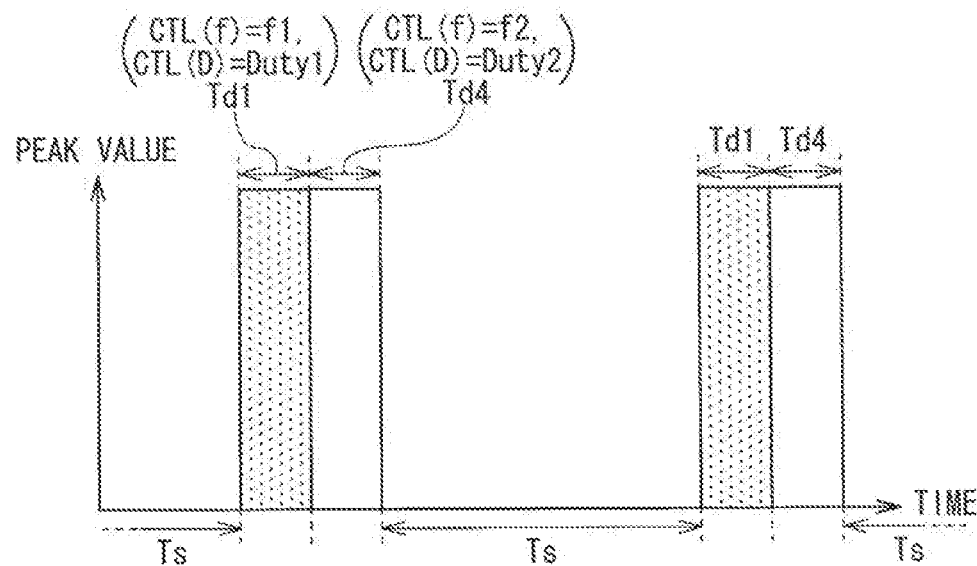
[ FIG. 15B ]
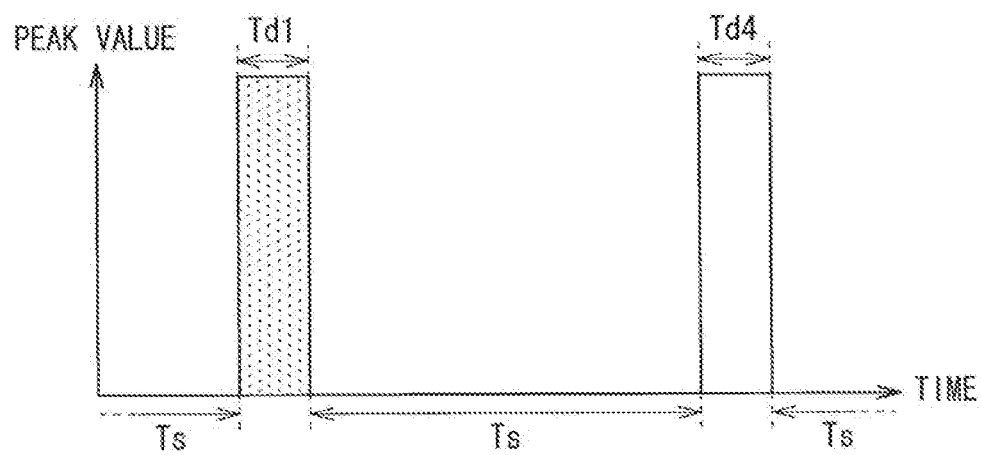

DEVICE AND SYSTEM FOR POWER TRANSMISSION

CROSS REFERENCE TO RELATED APPLICATION

The present application is a continuation application of U.S. patent application Ser. No. 15/652,576, filed Jul. 18, 2017, which is a continuation application of U.S. patent application Ser. No. 14/343,737, filed Mar. 7, 2014, which is a National Stage of PCT/JP2012/068546, filed Jul. 17, 2012, and claims the priority from prior Japanese Priority Patent Application JP 2011-197865 filed in the Japan Patent Office on Sep. 12, 2011. Each of the above-referenced applications is hereby incorporated herein by reference in its entirety.

TECHNICAL FIELD

The disclosure relates to a system that performs noncontact power supply (electric power transmission) to a device to be power-supplied (an electronic device and the like), and a device applied to such a system.

BACKGROUND

In recent years, attention has been given to a feed system (a noncontact feed system or a wireless charging system) that performs noncontact power supply (electric power transmission) to a CE device (Consumer Electronics Device) such as a portable telephone or a portable music player. This makes it possible to start the charge merely by placing an electronic device (a secondary-side device) on a charging tray (a primary-side device), instead of starting the charge by inserting (connecting) a connector of a power-supply unit such as an AC adapter into the device. In other words, terminal connection between the electronic device and the charging tray become unnecessary.

As a method of thus performing noncontact power supply, an electromagnetic induction method is well known. In recent years, a noncontact feed system using a method called a magnetic resonance method has also been receiving attention. Such noncontact feed systems are disclosed in PTLs 1 to 3, for example.

CITATION LIST

Patent Literature

PTL 1: Japanese Patent No. 3179802
PTL 2: Japanese Unexamined Patent Application Publication No. 2008-167582
PTL 3: Japanese Unexamined Patent Application Publication No. 2010-119251

SUMMARY OF INVENTION

Incidentally, in a noncontact feed system like those described above, when a feed unit (a primary-side device) is not allowed to determine whether a device to be power-supplied (a secondary-side device) is in proximity (close to the feed unit; in a region where power feeding is possible, for example), the feed unit keeps supplying the power, thereby causing wasteful power consumption.

Here, PTLs 1 to 3 each propose a technique of detecting whether a device to be power-supplied is in proximity to a feed unit. However, there is a disadvantage of lacking in convenience because, for example, a configuration, a technique, and the like are complicated.

Therefore, suggestion of a technique capable of conveniently detecting a device to be power-supplied at the time of electric power transmission (noncontact power feeding) using a magnetic field has been expected.

It is desirable to provide a device and a system capable of conveniently detecting a device to be power-supplied when electric power transmission is performed using a magnetic field.

A device for power transmission according to an embodiment of the disclosure includes a power transmission section configured to transmit an electric power wirelessly, and a detection section operatively connected to the power transmission section and configured to detect an object within a range from the power transmission section based on a change in impedance in vicinity of the power transmission section.

A system for power transmission according to an embodiment of the disclosure includes a transmitting device and a receiving device. The transmitting device includes a power transmission section configured to transmit an electric power wirelessly and a detection section operatively connected to the power transmission section and configured to detect a receiving device within a range from the power transmission section based on a change in impedance in vicinity of the power transmission section. The receiving device includes a power reception unit configured to receive the electric power wirelessly, and a load operatively connected to the power reception unit and configured to perform an operation based on the received electric power.

In the device and the system for power transmission according to the embodiments of the disclosure, whether the device to be power-supplied by the power transmission section is in proximity or not is detected using the change in the impedance in the vicinity of the power transmission section. This makes it possible to perform detection of the device to be power-supplied without complicating a configuration and a technique, for example.

According to the device and the system for power transmission of the embodiments of the disclosure, whether the device to be power-supplied by the power transmission section is in proximity or not is detected using the change in the impedance in the vicinity of the power transmission section. Therefore, it is possible to perform detection of the device to be power-supplied without complicating a configuration and a technique, for example. Hence, it is possible to detect the device to be power-supplied conveniently when the power transmission section is performed using the magnetic field.

It is to be understood that both the foregoing general description and the following detailed description are exemplary, and are intended to provide further explanation of the technology as claimed.

BRIEF DESCRIPTION OF DRAWINGS

The accompanying drawings are included to provide a further understanding of the disclosure, and are incorporated in and constitute a part of this specification. The drawings illustrate embodiments and, together with the specification, serve to explain the principles of the technology.

FIG. 1 is a perspective diagram illustrating an appearance configuration example of a feed system according to a first embodiment of the disclosure.

FIG. 2 is a block diagram illustrating a detailed configuration example of the feed system depicted in FIG. 1.

FIG. 3 is a circuit diagram illustrating a detailed configuration example of part of blocks depicted in FIG. 2.

FIG. 4 is a flowchart illustrating an operation example of a feed unit according to the first embodiment.

FIG. 5 is a timing chart illustrating an example of a detection period and a non-detection period for detection of a secondary-side device.

FIGS. 6A and 6B are characteristic diagrams used to explain a change in impedance characteristics in response to the presence or absence of the secondary-side device and a metallic foreign object.

FIGS. 7A and 7B are diagrams illustrating timing waveforms each representing an example of a control signal for a high-frequency power generation circuit.

FIGS. 8A and 8B are characteristic diagrams used to explain a change in harmonic component corresponding to a duty ratio of the control signal.

FIG. 9 is a characteristic diagram used to explain a change in impedance characteristics in response to a change in the harmonic component.

FIG. 10 is a timing chart illustrating an example of a power feeding period and a communication period.

FIG. 11 is a block diagram illustrating a configuration example of a feed system according to a second embodiment.

FIG. 12 is a flowchart illustrating an operation example of a feed unit according to the second embodiment.

FIGS. 13A and 13B are timing charts illustrating a detection period and a non-detection period according to modifications 1 and 2.

FIGS. 14A and 14B are timing charts illustrating a detection period and a non-detection period according to modifications 3 and 4.

FIGS. 15A and 15B are timing charts illustrating a detection period and a non-detection period according to modifications 5 and 6.

DESCRIPTION OF EMBODIMENTS

Embodiments of the disclosure will be described below in detail with reference to the drawings. It is to be noted that the description will be provided in the following order.
1. First embodiment (an example using impedance determined from an alternating current and an AC voltage)
2. Second embodiment (an example using direct-current resistance determined from a direct current and a DC voltage).
3. Modifications common to the first and second embodiments
   Modifications 1 and 2 (examples each using a plurality of kinds of value for a frequency of a control signal)
   Modifications 3 and 4 (examples each using a plurality of kinds of value for a duty ratio of the control signal)
   Modifications 5 and 6 (examples each using a plurality of kinds of value for the frequency and the duty ratio of the control signal)
4. Other modifications First Embodiment

[Overall Configuration of Feed System 4]

FIG. 1 illustrates an appearance configuration example of a feed system (a feed system 4) according to the first embodiment of the disclosure, and FIG. 2 illustrates a block configuration example of this feed system 4. The feed system 4 is a system (a noncontact-type feed system) that performs electric power transmission (power supply, or power feeding) in a noncontact manner by using a magnetic field (by using electromagnetic induction, magnetic resonance, or the like, for example; likewise hereinafter). This feed system 4 includes a feed unit 1 (a primary-side device) and one or a plurality of electronic devices (here, two electronic devices 2A and 2B; secondary-side devices) each serving as a device to be power-supplied.

In this feed system 4, electric power transmission from the feed unit 1 to the electronic devices 2A and 2B is performed by placing the electronic devices 2A and 2B on (or brought close to) a power feeding surface (a power transmission surface) S1 in the feed unit 1, as illustrated in FIG. 1, for example. Here, in consideration of a case where the electric power transmission to the electronic devices 2A and 2B is performed simultaneously or time-divisionally (sequentially), the feed unit 1 is shaped like a mat (a tray) in which the area of the power feeding surface S1 is larger than the electronic devices 2A and 2B to be supplied with the power.

(Feed Unit 1)

The feed unit 1 is a unit (a charging tray) that performs the electric power transmission to the electronic devices 2A and 2B by using a magnetic field as described above. This feed unit 1 includes a power transmission unit 11 having a power transmission section 110, a power circuit 111, a high-frequency power generation circuit (an AC signal generation circuit) 112, a current-voltage detection section 113, a control section 114, and a capacitor C1 (a capacitive element) as illustrated in FIG. 2, for example. Of these, the current-voltage detection section 113 and the control section 114 correspond to a specific example of a "detection section" of the disclosure, and the control section 114 corresponds to a specific example of a "control section" of the disclosure.

The power transmission section 110 is configured to include a power transmission coil (a primary-side coil) L1 to be described later, and the like. The power transmission section 110 uses the power transmission coil L1 and the capacitor C1 thereby performing the electric power transmission to the electronic devices 2A and 2B (specifically, a power reception section 210 to be described later) through use of the magnetic field. Specifically, the power transmission section 110 has a function of emitting a magnetic field (a magnetic flux) from the power feeding surface S1 to the electronic devices 2A and 2B. It is to be noted that a configuration of this power transmission section 110 will be described later in detail (FIG. 3).

The power circuit 111 is, for example, a circuit that generates a predetermined DC voltage based on electric power (AC power or DC power) supplied from a power supply source 9 external to the feed unit 1, and outputs the generated DC voltage to the high-frequency power generation circuit 112. Such a power circuit 111 is configured to include, for example, a DC-DC converter or an AC-DC converter. It is to be noted that this power circuit 111 may not be provided in some cases.

The high-frequency power generation circuit 112 is a circuit that generates predetermined high-frequency electric power (an AC signal) used to perform the electric power transmission in the power transmission section 110, based on the DC voltage outputted from the power circuit 111. Such a high-frequency power generation circuit 112 is configured using, for example, a switching amplifier to be described later. It is to be noted that a configuration of this high-frequency power generation circuit 112 will also be described later in detail (FIG. 3).

The current-voltage detection section 113 has a current detection section 113I and a voltage detection section 113V which will be described later, and detects an alternating current (a current I1) and an AC voltage (a voltage V1) in the vicinity of the power transmission section 110 (here, on a load side of the high-frequency power generation circuit 112), respectively. It is to be noted that a configuration of this current-voltage detection section 113 will also be described later in detail (FIG. 3).

The control section 114 has a function of controlling operation of each of the power circuit 111 and the high-frequency power generation circuit 112. Specifically, the control section 114 drives the high-frequency power generation circuit 112 by using a control signal CTL having a predetermined frequency and a predetermined duty ratio, as will be described later in detail. Further, the control section 114 also has a function of detecting whether or not a device (the secondary-side device; here, the electronic devices 2A and 2B) to be supplied with power by the power transmission section 110 is in proximity (in the vicinity of the power feeding surface S1; for example, in a region where power feeding is possible, likewise hereinafter), based on the current I1 and the voltage V1 detected in the current-voltage detection section 113. Specifically, as will be described later in detail, this control section 114 detects the device to be power-supplied by using a change in impedance (here, a load impedance of the high-frequency power generation circuit 112 (the switching amplifier to be described later)) in the vicinity of the power transmission section 110. Here, this load impedance is impedance of a load connected to the switching amplifier to be described later, and is determined by the alternating current (the current I1) and the AC voltage (the voltage V1) described above. It is to be noted that such a control section 114 is, for example, a microcomputer or the like.

The capacitor C1 is disposed to be connected to the power transmission coil L1 electrically in parallel or in a combination of parallel and series.

(Electronic Devices 2A and 2B)

The electronic devices 2A and 2B are, for example, stationary electronic devices represented by television receivers, portable electronic devices containing a chargeable battery (battery) represented by portable telephones and digital cameras, and the like. As illustrated in, for example, FIG. 2, these electronic devices 2A and 2B each include a power reception unit 21, and a load 22 that performs predetermined operation (operation of performing functions of serving as the electronic device) based on electric power supplied from this power reception unit 21. Further, the power reception unit 21 includes the power reception section 210, a rectifying and smoothing circuit 211, a voltage stabilizing circuit 212, and a capacitor (a capacitive element) C2.

The power reception section 210 is configured to include a power reception coil (a secondary-side coil) L2. The power reception section 210 has a function of receiving electric power transmitted from the power transmission section 110 in the feed unit 1 by using this power reception coil L2 and the capacitor C2. It is to be noted that a configuration of this power reception section 210 will also be described later in detail (FIG. 3).

The rectifying and smoothing circuit 211 is a circuit that generates DC power by rectifying and smoothing electric power (AC power) supplied from the power reception section 210.

The voltage stabilizing circuit 212 is a circuit that performs predetermined voltage stabilization operation based on the DC power supplied from the rectifying and smoothing circuit 211, thereby charging a battery (not illustrated) in the load 22. It is to be noted that such a battery is configured using, for example, a chargeable battery (a secondary battery) such as a lithium ion battery.

The capacitor C2 is disposed to be connected to the power reception coil L2 electrically in parallel or in a combination of parallel and series.

[Detailed Configuration of Elements including High-frequency Power Generation Circuit 112 and Current-Voltage Detection Section 113]

FIG. 3 is a circuit diagram illustrating a detailed-configuration example of the power transmission section 110, the capacitor C1, the high-frequency power generation circuit 112, the current-voltage detection section 113 (the current detection section 113I and the voltage detection section 113V), the power reception section 210, and the capacitor C2.

The power transmission section 110 has the power transmission coil L1, and the power reception section 210 has the power reception coil L2. The power transmission coil L1 is the coil used to perform the electric power transmission using the magnetic field (to cause the magnetic flux), as described above. On the other hand, the power reception coil L2 is the coil used to receive the electric power transmitted from the power transmission section 110 (from the magnetic flux).

The high-frequency power generation circuit 112 is the circuit that generates the high-frequency electric power (the AC signal) made of an AC voltage Vac and an alternating current Iac based on a DC voltage Vdc (a direct current Idc) supplied from the power circuit 111. Here, this high-frequency power generation circuit 112 is configured using a switching amplifier (a so-called class E amplifier) including a single transistor 112T as a switching element. This switching amplifier includes a capacitor 112C used for ripple removal, a coil 112L serving as a choke coil, and the transistor 112T that is an N-type FET (Field Effective Transistor). One end of the capacitor 112C is connected to an output line from the power circuit 111 as well as one end of the coil 112L, and the other end is grounded. The other end of the coil 112L is connected to a drain of the transistor 112T and one end of each of capacitors C1$p$ and C1$s$ at a connection point P21. A source of the transistor 112T is grounded, and to a gate, the control signal CTL supplied from the control section 114 as described above is inputted. It is to be noted that the other end of the capacitor C1$s$ is connected to one end of the power transmission coil L1, and the other end of the capacitor C1$p$ is grounded. Based on such a configuration, the high-frequency electric power described above is generated in the high-frequency power generation circuit 112 by causing the transistor 112T to perform ON/OFF operation (switching operation including a predetermined switching frequency and a predetermined duty ratio) according to the control signal CTL.

The current detection section 113I is a circuit that detects the current I1 (the alternating current) described above, and here, is disposed between the other end of the power transmission coil L1 and a ground. This current detection section 113I includes a resistance R11, an amplifier A1, a diode D1, and a capacitor C31. The resistance R11 is disposed between the other end (a connection point P22) of the power transmission coil L1 and the ground. As for the amplifier A1, one input terminal is connected to the connection point P22, the other input terminal is connected to the ground, and an output terminal is connected to an anode of the diode D1. In other words, a potential difference between both ends of the resistance R11 is inputted into this amplifier A1. A cathode of the diode D1 is connected to one end (a connection point P23) of the capacitor C31, and the other end of the capacitor C31 is grounded. Based on such a configuration, in the current detection section 113I, a detection result of the current I1 (the alternating current) described above is outputted from the cathode side (the connection point P23) of the diode D1.

The voltage detection section 113V is a circuit that detects the voltage V1 (the AC voltage) described above, and here, is disposed between the connection point P21 and the ground. This voltage detection section 113V has resistances R21 and R22, an amplifier A2, a diode D2, and a capacitor C32. One end of the resistance R21 is connected to the connection point P21, and the other end is connected to a connection point P24. One end of the resistance R22 is connected to the connection point P24, and the other end is connected to the ground. As for the amplifier A2, one input terminal is connected to the connection point P24, the other input terminal is connected to the ground, and an output terminal is connected to an anode of the diode D2. A cathode of the diode D2 is connected to one end (a connection point P25) of the capacitor C32, and the other end of the capacitor C32 is grounded. Based on such a configuration, in the voltage detection section 113V, a detection result of the voltage V1 (the AC voltage) described above is outputted from the cathode side (the connection point P25) of the diode D2.

One end of a capacitor C2p is connected to one end of the power reception coil L2 at a connection point P26, and the other end is connected to the other end of the power reception coil L2 at a connection point P27. One end of a capacitor C2s is connected to the connection point P26, and the other end is connected to one input terminal of the rectifying and smoothing circuit 211. It is to be noted that the other input terminal of the rectifying and smoothing circuit 211 is connected to the connection point P27.

[Operation and Effects of Feed System 4]

(1. Summary of Overall Operation)

In this feed system 4, the predetermined high-frequency electric power (the AC signal) for the electric power transmission is supplied to the power transmission coil L1 and the capacitor C1 in the power transmission section 110 by the high-frequency power generation circuit 112, in the feed unit 1. This causes the magnetic field (the magnetic flux) in the power transmission coil L1 in the power transmission section 110. At this moment, when the electronic devices 2A and 2B each serving as the device to be power-supplied (the device to be charged) are placed on (or brought close to) the top surface (the feeding surface S1) of the feed unit 1, the power transmission coil L1 in the feed unit 1 and the power reception coil L2 in each of the electronic devices 2A and 2B are in proximity to each other in the vicinity of the power feeding surface S1.

In this way, when the power reception coil L2 is placed in proximity to the power transmission coil L1 producing the magnetic field (the magnetic flux), an electromotive force is evoked in the power reception coil L2 by the magnetic flux produced by the power transmission coil L1. As a result, electric power is transmitted from the power transmission coil L1 side (a primary side, the feed unit 1 side, and the power transmission section 110 side) to the power reception coil L2 side (a secondary side, the electronic devices 2A and 2B side, and the power reception section 210 side) (see electric power P1 illustrated in FIG. 2 and FIG. 3).

Then, in the electronic devices 2A and 2B, the AC power received by the power reception coil L2 is supplied to the rectifying and smoothing circuit 211 and the voltage stabilizing circuit 212, and the following charging operation is performed. That is, after this AC power is converted into predetermined DC power by the rectifying and smoothing circuit 211, the voltage stabilization operation based on this DC power is performed by the voltage stabilizing circuit 212, and the battery (not illustrated) in the load 22 is charged. In this way, in the electronic devices 2A and 2B, the charging operation based on the electric power received by the power reception section 210 is performed.

In other words, in the present embodiment, at the time of charging the electronic devices 2A and 2B, terminal connection to an AC adapter or the like, for example, is unnecessary, and it is possible to start the charge easily by merely placing the electronic devices 2A and 2B on (or bringing the electronic devices 2A and 2B close to) the power feeding surface S1 of the feed unit 1 (noncontact power feeding is performed). This leads to a reduction in burden on a user. Further, this noncontact power feeding has advantages including preventing characteristic deterioration due to abrasion of contacts and no concern about an electric shock due to touching a contact by a person. Furthermore, there is also such an advantage that it is possible to prevent a contact from corroding by becoming wet, in a case of application to, for example, a device used in a wet environment, such as a toothbrush or a shaver.

(2.2 Operation Including Detection Operation of Secondary-Side Device)

Next, operation (detection operation and the like of the electronic devices 2A and 2B (the secondary-side devices) each serving as the device to be power-supplied) in the feed unit 1 (the power transmission unit 11) of the present embodiment will be described with reference to FIG. 4 to FIG. 10. FIG. 4 is a flowchart illustrating an example of this operation in the feed unit 1.

First, the feed unit 1 performs predetermined activation processing such as initialization of a control terminal (not illustrated), for example (step S101).

Then, the current-voltage detection section 113 (the current detection section 113I and the voltage detection section 113V) detects the alternating current (the current I1) and the AC voltage (the voltage V1) in the vicinity of the power transmission section 110 (on the load side of the high-frequency power generation circuit 112), respectively, by the technique described above (step S102).

Next, the control section 114 calculates impedance Z1 (the load impedance of the high-frequency power generation circuit 112 (the switching amplifier); see FIG. 3) in the vicinity of the power transmission section 110 by using the current I1 and the voltage V1 detected by the current-voltage detection section 113 (step S103). Specifically, it is possible to determine an absolute value |Z1| of this impedance Z1 by the following expression (1).

$$|Z1|=(V1/I1) \qquad (1)$$

Subsequently, through use of a change in the impedance Z1 calculated as described above, whether the secondary-side device (the electronic devices 2A and 2B) serving as the device to be power-supplied is in proximity or not is detected by the control section 114 as follows.

Here, it is desirable that, specifically, such detection of the device to be power-supplied be performed intermittently at a predetermined interval (a non-detection period (a detection stop period) Ts), as illustrated in FIG. 5, for example. This is because performing such detection constantly increases power consumption for the detection operation. However, when this non-detection period Ts is set to be longer than necessary, time for the detection of the device to be power-supplied tends to become longer as well and therefore, it is necessary to set the non-detection period Ts appropriately. It may be said that, by taking account of a balance between these facts, it is desirable that the interval (the non-detection period Ts) between the detection periods (the detection periods Td) of detecting the device to be power-supplied be freely controllable manually or automatically, for example.

The detection of the device to be power-supplied (the secondary-side device) by the control section 114 described above is specifically performed as follows. That is, at first, as indicated by a sign G0 in FIG. 6A, for example, the frequency characteristics of the absolute value |Z1| of the impedance Z1 exhibits a peak at a resonance frequency f0 when the secondary-side device is not in proximity (is absent). Here, this resonance frequency f0 may be expressed by the following expressions (2) and (3).

$$f0=1/\{2\pi\times\sqrt{(L1\times C1)}\} \quad (2)$$

$$C1=(C1s\times C1p)/(C1s+C1p) \quad (3)$$

On the other hand, as indicated by arrows P3L and P3H as well as a sign G1 in FIG. 6A, the frequency characteristics of the absolute value |Z1| of the impedance Z1 exhibit a so-called double hump characteristics when the secondary-side device is in proximity (is present). In other words, a peak is exhibited at each of a frequency f1H on a high frequency side and a frequency f1L on a low frequency side, of the resonance frequency f0. For this reason, a variation ΔZ (a variation from the time when the secondary-side device is absent to the time when the secondary-side device is present) in the absolute value |Z1| of the impedance Z1 is a positive value (ΔZ>0) at frequencies in the neighborhood of the frequency f1H and the frequency f1L, as illustrated in FIG. 6A, for example.

Using this, the control section 114 determines the presence or absence of the device to be power-supplied, based on an increment (the variation ΔZ) in the absolute value |Z1| of the impedance Z1. Specifically, the control section 114 determines the presence or absence of the device to be power-supplied by comparing the variation ΔZ(>0) in the impedance with a predetermined threshold ΔZth (step S104). In other words, when this variation ΔZ (the increment) is greater than the threshold ΔZth (ΔZ>ΔZth) (step S104: Y), it is determined that the secondary-side device (the device to be power-supplied) is in proximity (is present) (step S106). On the other hand, when this variation ΔZ (the increment) is equal to or less than the threshold ΔZth (ΔZ≤ΔZth) (step S104: N), it is determined that the secondary-side device (the device to be power-supplied) is not in proximity (is absent) (step S105).

At this moment, it is also possible to distinguish between the presence and absence of a foreign object (metallic foreign object) different from the device to be power-supplied. In other words, as indicated by signs G0 and G2 as well as an arrow P4 in FIG. 6B, for example, in a case where a metallic foreign object exists (is present) in proximity to the feed unit 1 (the feeding surface S1), the absolute value |Z1| of the impedance Z1 tends to decrease, as compared with a case where a metallic foreign object does not exist (is absent). This is because an eddy current is produced in the metallic foreign object, resulting in a loss of electric power. Therefore, it is possible to determine the presence or absence of such a foreign object according to whether the absolute value |Z1| of the impedance Z1 exhibits an increasing change or a decreasing change (whether the variation ΔZ is a positive value or a negative value) at frequencies in the neighborhood of the frequencies f1H and f1L described above, for example. This makes it possible to avoid applying electric power to the power transmission coil L1 wastefully, and also to evade fears such as heat generation of the metallic foreign object.

It is to be noted that the value of the absolute value |Z1| of the impedance Z1 in the vicinity of the frequencies f1H and f1L when the secondary-side device is placed in proximity to the primary-side device depends on the magnitude of a Q value in a resonance circuit of the secondary-side device. In other words, the higher this Q value is, the greater the value of the absolute value |Z1| is, and therefore, it may be said that, desirably, the load of the secondary-side device is a highest possible resistance value at the time of the detection operation.

Here, it is desirable that the control section 114 control one or both of a frequency CTL(f) and a duty ratio CTL(D) in the control signal CTL, thereby adjusting the variation ΔZ in the absolute value |Z1| of the impedance Z1. This is because detectability is enhanced by setting the difference (the variation ΔZ) in |Z1| between the time when the device to be power-supplied is present and the time when it is absent to be as large as possible (maximum), like the frequencies in the vicinity of the frequencies f1H and f1L described above.

Specifically, the control section 114 controls the frequency CTL(f) in the control signal CTL to become a frequency in the vicinity of the frequencies f1H and f1L, as illustrated in FIG. 6A, for example.

In addition, as illustrated in FIGS. 7A and 7B, for example, the control section 114 controls the duty ratio CTL(D) in the control signal CTL so that the variation ΔZ in the absolute value |Z1| of the impedance Z1 becomes as large as possible. This control is performed using the following phenomena. That is, for example, as indicated by signs P51 and P52 in FIGS. 8A and 8B, there is a difference in terms of the magnitude of a harmonic component in the absolute value |Z1| of the impedance Z1, between a case where the duty ratio CTL(D)=about 50% which is relatively high (corresponding to FIG. 7A) and a case where the duty ratio CTL(D)=about 10% which is relatively low (corresponding to FIG. 7B). Therefore, it is desirable that the control section 114 adjust the variation ΔZ by taking account of the fact that the magnitude of the harmonic component in the absolute value |Z1| of the impedance Z1 changes in response to a change in the duty ratio CTL(D), as indicated by signs G3L and G3H as well as arrows PH and P5H in FIG. 9, for example.

Here, when it is determined that the secondary-side device is in proximity in step S106, predetermined device authentication is then performed for the secondary-side device (the electronic devices 2A and 2B) by the feed unit 1 (step S107), for example. Subsequently, the feed unit 1 performs the noncontact feeding operation described above, thereby charging the electronic devices 2A and 2B which are the devices to be power-supplied (step S108). In other words, the power transmission section 110 starts the electric power transmission to the device to be power-supplied after the device to be power-supplied is detected. In this feeding operation, specifically, a feeding period Tp and a communication period Tc (a period in which predetermined communication operation is performed between the primary-side device and the secondary-side device) are provided time-divisionally and periodically, as illustrated in FIG. 10, for example.

Subsequently, the feed unit 1 determines whether or not to terminate whole processing illustrated in FIG. 4, for example (step S109). Here, when it is determined that the whole processing is not to be terminated yet (step S109: N), the feed unit 1 then determines whether predetermined time that is set beforehand has elapsed (step S110), for example. When it is determined that the predetermined time has not elapsed yet (step S110: N), the flow returns to step S108 to continue the power feeding operation. On the other hand, when it is determined that the predetermined time has elapsed (step S110: Y), the flow returns to step S102 to perform the detection operation of the secondary-side device. In this way, it is desirable that the current-voltage detection section 113 and the control section 114 perform the detection of the device to be power-supplied periodically also after the electric power transmission is started.

It is to be noted that when it is determined that the whole processing is to be terminated (step S109: Y), the operation (whole processing) in the feed unit 1 illustrated in FIG. 4 ends.

In this way, in the present embodiment, whether the device to be supplied with the power by the power transmission section 110 is in proximity or not is detected using the change in the impedance Z1 in the vicinity of the power transmission section 110. This makes it possible to perform the detection of the device to be power-supplied without complicating the configuration, the technique, and the like, for example.

In the present embodiment as described above, whether the device to be supplied with the power by the power transmission section 110 is in proximity or not is detected using the change in the impedance Z1 in the vicinity of the power transmission section 110 and thus, it is possible to perform the detection of the device to be power-supplied without complicating the configuration, the technique, and the like, for example. Therefore, it is possible to detect the device to be power-supplied conveniently when the electric power transmission is performed using the magnetic field. This makes it possible to detect the device to be power-supplied even when a coefficient of coupling between the power transmission coil L1 and the power reception coil L2 is low, about 0.4 or less, for example.

Further, for instance, addition of a magnet and a circuit such as a magnetic sensor is unnecessary and thus, it is possible to reduce the cost and size, and also a frequency for the detection is allowed to be set freely. Therefore, for example, application to circuits other than a self-excited oscillation circuit is possible.

It is to be noted that the current-voltage detection section 113 may not be provided in a case where a circuit detecting a current or a voltage is already provided in a feed unit for the purpose of measuring its own power consumption, for example. In that case, additional hardware is unnecessary.

Second Embodiment

Next, the second embodiment of the disclosure will be described. It is to be noted that the same elements as those of the first embodiment will be provided with the same characters as those of the first embodiment, and the description will be omitted as appropriate.

[Overall Configuration of Feed System 4A]

FIG. 11 illustrates an example of an overall block configuration of a feed system (a feed system 4A) according to the second embodiment. The feed system 4A of the present embodiment also is a feed system that performs noncontact electric power transmission using a magnetic field, and includes a feed unit 1A (a primary-side device) and one or more electronic devices (here, two electronic devices 2A and 2B; secondary-side devices) each serving as a device to be power-supplied. In other words, this feed system 4A includes the feed unit 1A in place of the feed unit 1 in the feed system 4 of the first embodiment, and is otherwise similar in configuration to the feed system 4.

(Feed Unit 1A)

The feed unit 1A performs the electric power transmission to the electronic devices 2A and 2B using the magnetic field in a manner similar to the feed unit 1. This feed unit 1A includes a power transmission unit 11A having a power transmission section 110, a power circuit 111, a high-frequency power generation circuit 112, a current-voltage detection section 113A, a control section 114, and a capacitor C1. In other words, this power transmission unit 11A is provided with the current-voltage detection section 113A in place of the current-voltage detection section 113 in the power transmission unit 11 described in the first embodiment. It is to be noted that the current-voltage detection section 113A and the control section 114 correspond to a specific example of a "detection section" of the disclosure.

The current-voltage detection section 113A detects a direct current (a current I2) and a DC voltage (a voltage V2) in the vicinity of the power transmission section 110, instead of the alternating current (the current I1) and the AC voltage (the voltage V1) described in the first embodiment. The current I2 and the voltage V2 correspond to a direct current and a DC voltage to be supplied from the power circuit 111 to the high-frequency power generation circuit 112, respectively.

Then, in the control section 114 of the present embodiment, instead of the impedance Z1 described in the first embodiment, a DC resistance value R2 determined based on the direct current (the current I2) and the DC voltage (the voltage V2) is used as impedance in the vicinity of the power transmission section 110. This DC resistance value R2 is determined by the following expression (4).

$$R2=(V2/I2) \quad (4)$$

[Operation and Effects of Feed System 4A]

Specifically, for example, as in an operation example of the feed unit 1A (the power transmission unit 11A) of the present embodiment illustrated in FIG. 12, the control section 114 uses the DC resistance value R2 described above, a variation ΔR thereof, and a threshold ΔRth thereof, instead of the absolute value |Z1| of the impedance Z1 described in the first embodiment, the variation ΔR thereof, and the threshold ΔRth thereof (steps S202 to S204).

Here, electric power consumed in or after the high-frequency power generation circuit 112 (a switching amplifier) is determined based on this DC resistance value R2. On the other hand, an increase in the impedance Z1 reduces a current flowing into the power transmission section 110 and therefore, power consumption in the power transmission section 110 is reduced, and as a result, the DC resistance value R2 is increased. For this reason, it is possible to determine the presence or absence of the secondary-side device by judging the magnitude of the DC resistance value R2, like the case of the impedance Z1.

At this moment, when power consumption except the one in the power transmission section 110 is large, a tendency of the impedance Z1 and a tendency of the DC resistance value R2 disagree with each other, reducing accuracy of detecting the secondary-side device. Most of such power consumption except the one in the power transmission section 110 is a loss by a coil 112L and a switching element (a transistor 112T). In order to reduce the electric power loss by these, it is conceivable to perform driving with a high DC voltage to reduce the ratio of a current, or to shorten an ON period of the switching element by reducing a driving duty ratio of the switching amplifier, besides selecting a low-loss element.

In this way, it is possible to obtain similar effects by similar operation to those of the first embodiment, in the present embodiment as well. In other words, it is possible to detect the device to be power-supplied conveniently when performing the electric power transmission using the magnetic field.

It is to be noted that the current-voltage detection section 113A may not be provided in some cases, and in that case, additional hardware is unnecessary in the present embodiment as well.

[Modifications]

Next, modifications (modifications 1 to 6) common to the first and second embodiments will be described. It is to be noted that the same elements as those of these embodiments will be provided with the same characters as those of these embodiments, and the description thereof will be omitted as appropriate.

[Modifications 1 and 2]

FIG. 13A is a timing chart illustrating detection periods Td1 and Td2 as well as the non-detection period Ts according to the modification 1, and FIG. 13B is a timing chart illustrating the detection periods Td1 and Td2 as well as the non-detection period Ts according to the modification 2. In these modifications 1 and 2, a plurality of kinds of value (here, two kinds; frequencies f1 and f2) are used for the frequency (CTL(f)) in the control signal CTL, as will be described below. In other words, the control section 114 adjusts the variation in the impedance by using the plurality of kinds of value for the frequency (CTL(f)) in the control signal CTL.

Specifically, in the modification 1 illustrated in FIG. 13A, the control section 114 sequentially uses the two kinds of value (the frequencies f1 and f2) one by one during the detection period of detecting the device to be power-supplied (a period corresponding to the detection periods Td1 and Td2 as a whole). This makes it possible to shorten the time for the detection relatively as compared with a technique in FIG. 13B which will be described below.

In the modification 2 illustrated in FIG. 13B on the other hand, the control section 114 selectively uses one of the two kinds of value (the frequencies f1 and f2), for every detection period of detecting the device to be power-supplied (for each of the detection periods Td1 and Td2). This makes it possible to reduce the power consumption in the detection operation relatively as compared with the technique of FIG. 13A described above.

[Modifications 3 and 4]

FIG. 14A is a timing chart illustrating detection periods Td1 and Td3 as well as the non-detection period Ts according to the modification 3, and FIG. 14B is a timing chart illustrating the detection periods Td1 and Td3 as well as the non-detection period Ts according to the modification 4. In these modifications 3 and 4, a plurality of kinds of value (here, two kinds of duty ratio; Duty1 and Duty2) are used for the duty ratio (CTL(D)) in the control signal CTL, as will be described below.

Specifically, in the modification 3 illustrated in FIG. 14A, the control section 114 sequentially uses the two kinds of value (the duty ratios Duty1 and Duty2) one by one in the detection period of detecting the device to be power-supplied (the detection periods Td1 and Td3). This makes it possible to shorten the time for the detection relatively as compared with a technique of FIG. 14B which will be described below.

In the modification 4 illustrated in FIG. 14B on the other hand, the control section 114 selectively uses one of the two kinds of value (the duty ratios Duty1 and Duty2) for every detection period of detecting the device to be power-supplied (for each of the detection periods Td1 and Td3). This makes it possible to reduce the power consumption in the detection operation relatively as compared with the technique of FIG. 14A described above.

[Modifications 5 and 6]

FIG. 15A is a timing chart illustrating detection periods Td1 and Td4 as well as the non-detection period Ts according to the modification 5, and FIG. 15B is a timing chart illustrating the detection periods Td1 and Td4 as well as the non-detection period Ts according to the modification 6. In these modifications 5 and 6, a plurality of kinds of value (here, the two kinds of frequency; f1 and f2, and the two kinds of duty ratio; Duty1 and Duty2) are used for both of the frequency (CTL(f)) and the duty ratio (CTL(D)) of the control signal CTL, as will be described below. In other words, in these modifications 5 and 6, the modifications 1 and 2 are combined with the modifications 3 and 4.

Specifically, in the modification 5 illustrated in FIG. 15A, the control section 114 uses sequentially the two kinds of value (the frequencies f1 and f2 as well as the duty ratios Duty1 and Duty2) one by one during the detection period of detecting the device to be power-supplied (the detection periods Td1 and Td4). This makes it possible to shorten the time for the detection relatively as compared with a technique of FIG. 15B which will be described below.

In the modification 6 illustrated in FIG. 15B on the other hand, the control section 114 selectively uses by one of the two kinds of value (the frequencies f1 and f2 as well as the duty ratios Duty1 and Duty2), for every detection period of detecting the device to be power-supplied (for each of the detection periods Td1 and Td4). This makes it possible to reduce the power consumption in the detection operation relatively as compared with the technique of FIG. 15A described above.

[Other Modifications]

The technology of the disclosure has been described using some embodiments and modifications, but is not limited to these embodiments and modifications, and may be variously modified.

For example, in the embodiments and modifications, the description has been provided specifically using the configuration of the high-frequency power generation circuit, although it is not limited thereto. For example, a configuration employing a half-bridge circuit or a full-bridge circuit may be provided.

Further, in the embodiments and modifications, the description has been provided specifically using the configuration of the current-voltage detection section and the detection operation, although it is not limited thereto. Other configuration and detection operation may be employed.

Furthermore, in the embodiments and modifications, the description has been provided by taking the electronic device as an example of the device to be power-supplied, although it is not limited thereto. Devices to be power-supplied other than the electronic devices may be used (for example, vehicles such as electric cars).

In addition, in the embodiments and modifications, the description has been provided specifically using the configuration of each of the feeding unit and the device to be power-supplied (the electronic device etc.). However, it is not necessary to provide all the elements, and other configuration may be further provided. For instance, a battery for charge may be provided also in the power reception unit 21 in some cases.

Moreover, in the embodiments and modifications, the description has been provided by taking the case where the plurality of (two) devices to be power-supplied (electronic devices) are provided in the feed system as an example, although it is not limited thereto. Only one device to be power-supplied may be provided in the feed system.

Furthermore, in the embodiments and modifications, the description has been provided by taking the charging tray for the small electronic devices (CE devices) such as portable telephones as an example of the feed unit. However, the feed unit is not limited to such a home charging tray, and is applicable to chargers for various devices to be power-supplied (electronic devices etc.). In addition, the feed unit may not be a tray, and may be a stand for an electronic device such as a so-called cradle, for example.

It is possible to achieve at least the following configurations from the above-described example embodiments and the modifications of the disclosure.

(1) A device for power transmission comprising:
a power transmission section configured to transmit an electric power wirelessly; and
a detection section operatively connected to the power transmission section and configured to detect an object within a range from the power transmission section based on a change in impedance in vicinity of the power transmission section.

(2) The device of (1), further comprising a power generation circuit operatively connected to the power transmission section and configured to generate the electric power.

(3) The device of (2), wherein the electric power is a high-frequency electric power.

(4) The device of (2), wherein the detection section comprises:
a current-voltage detection unit configured to detect a current and a voltage in vicinity of the power transmission section; and
a control unit operatively connected to the current-voltage detection unit and configured to detect the object based on the change in impedance calculated by the detected current and voltage in vicinity of the power transmission section.

(5) The device of (4), wherein the detected current is an alternating current and the detected voltage is an AC voltage.

(6) The device of (4), wherein:
the detected current is a direct current and the detected voltage is a DC voltage; and
the change in impedance is a change in resistance calculated by the direct current and the DC voltage.

(7) The device of (1), wherein the detection section is configured to determine whether the detected object is a device to be power-supplied by the power transmission section or a foreign object based on whether the impedance increases or decreases.

(8) The device of (7), wherein the determination is made based on whether an absolute value of the impedance increases or decreases.

(9) The device of (7), wherein the determination is made based on whether a resistance value increases or decreases.

(10) The device of (7), wherein the detected object is a device to be power-supplied by the power transmission section if the impedance increases.

(11) The device of (7), wherein the detected object is a foreign object if the impedance decreases.

(12) The device of (1), wherein the detection section is configured to detect the object intermittently at an interval.

(13) The device of (1), wherein the detection section is configured to detect the object by comparing the change in impedance with a threshold value.

(14) The device of (4), wherein the control section is configured to sequentially provide two control signals during each detection period for detecting the object, the two control signals having a same duty ratio but different frequencies.

(15) The device of (4), wherein the control section is configured to sequentially provide two control signals for each two subsequent detection periods for detecting the object, the two control signals having a same duty ratio but different frequencies.

(16) The device of (4), wherein the control section is configured to sequentially provide two control signals during each detection period for detecting the object, the two control signals having a same frequency but different duty ratios.

(17) The device of (4), wherein the control section is configured to sequentially provide two control signals for each two subsequent detection periods for detecting the object, the two control signals having a same frequency but different duty ratios.

(18) The device of (4), wherein the control section is configured to sequentially provide two control signals during each detection period for detecting the object, the two control signals having different duty ratios and different frequencies.

(19) The device of (4), wherein the control section is configured to sequentially provide two control signals for each two subsequent detection periods for detecting the object, the two control signals having different duty ratios and different frequencies.

(20) The device of (4), wherein the control section is configured to control at least one of a frequency and a duty ratio in the control signal to adjust the change in impedance.

(21) A system for power transmission comprising:
a transmitting device comprising (a) a power transmission section configured to transmit an electric power wirelessly, and (b) a detection section operatively connected to the power transmission section and configured to detect a receiving device within a range from the power transmission section based on a change in impedance in vicinity of the power transmission section; and
a receiving device comprising (c) a power reception unit configured to receive the electric power wirelessly, and (d) a load operatively connected to the power reception unit and configured to perform an operation based on the received electric power.

(22) The system of (21), wherein the transmitting device further comprises a power generation circuit operatively connected to the power transmission section and configured to generate the electric power.

(23) The system of (22), wherein the detection section comprises:
a current-voltage detection unit configured to detect a current and a voltage in vicinity of the power transmission section; and
a control unit operatively connected to the current-voltage detection unit and configured to detect the object based on the change in impedance calculated by the detected current and voltage in vicinity of the power transmission section.

(24) A method for detecting an object comprising:
detecting a current and a voltage in vicinity of a power transmitting device;
calculating an impedance based on the detected current and voltage; and detecting an object within a range from the power transmitting device based on a change in the impedance.

(25) The method of (24), further comprising determining whether the detected object is a power receiving device to be power-supplied by the power transmission device or a foreign object based on whether the impedance increases or decreases.

(26) The method of (25), wherein the determination is made based on whether an absolute value of the impedance increases or decreases.

(27) The method of (25), wherein the determination is made based on whether a resistance value increases or decreases.

(28) The method of (25), wherein the detected object is a power receiving device if the impedance increases.

(29) The method of (25), wherein the detected object is a foreign object if the impedance decreases.

(30) The method of (24), further comprising comparing the change in the impedance with a threshold value.

(31) The method of (24), wherein the object is detected intermittently at an interval.

(32) The method of (25), further comprising, in response to determining that the detected object is a power receiving device, transmitting an electric power wirelessly from the power transmitting device to the power receiving device.

It should be understood by those skilled in the art that various modifications, combinations, sub-combinations, and alterations may occur depending on design requirements and other factors insofar as they are within the scope of the appended claims or the equivalents thereof.

What is claimed is:

1. A power transmitter, comprising:
a power generation circuit configured to supply an electric power to a resonance circuit, the resonance circuit including a power transmitting coil, the power transmitting coil being configured to carry out noncontact power feeding to a power receiver through a magnetic field;
a measurement circuitry configured to measure a voltage across a resistor arranged in series with the power transmitting coil periodically; and
a controller configured to determine a presence or absence of a foreign object within a range from the power transmitting coil based on the voltage across the resistor periodically,
wherein the noncontact power feeding to the power receiver is carried out for a predetermined period after the controller determines that the foreign object is absent within the range,
the measurement circuitry is configured to measure the voltage across the resistor after the noncontact power feeding to the power receiver is finished,
a first frequency is used to determine the presence or absence of the foreign object within the range from the power transmitting coil, and
a second frequency, different from the first frequency, is used to carry out the noncontact power feeding to the power receiver.

2. The power transmitter according to claim 1, wherein
the power transmitting coil is configured to transmit an electric power wirelessly to a power reception circuit of the power receiver; and
the measurement circuitry is configured to measure the voltage across the resistor before the electric power is wirelessly transmitted to the power reception circuit.

3. The power transmitter according to claim 2, wherein the power receiver comprises a load that is configured to perform predetermined operations based on the electric power transmitted to the power reception circuit.

4. The power transmitter according to claim 3, wherein the load is configured to charge a battery based on the electric power transmitted to the power reception circuit.

5. The power transmitter according to claim 1, wherein the controller is configured to monitor impedance based on the voltage and detect the foreign object based on the impedance.

6. The power transmitter according to claim 1, wherein the controller is configured to:
compare the voltage across the resistor with a threshold value; and
detect the foreign object based on the comparison.

7. A power transmitting apparatus, comprising:
a resonance circuit including a power transmitting coil;
a resistor arranged in series with the power transmitting coil;
a power generation circuit configured to supply electric power to the resonance circuit, the power transmitting coil being configured to carry out noncontact power feeding to a power receiver through a magnetic field;
a measurement circuitry configured to measure a voltage across the resistor periodically; and
a controller configured to determine a presence or absence of a foreign object within a range from the power transmitting coil based on the voltage across the resistor before the noncontact power feeding to the power receiver is carried out,
wherein the noncontact power feeding to the power receiver is carried out for a predetermined period after the controller determines that the foreign object is absent within the range,
the measurement circuitry is configured to measure the voltage across the resistor after the noncontact power feeding to the power receiver is finished,
a first frequency is used to determine the presence or absence of the foreign object within the range from the power transmitting coil, and
a second frequency, different from the first frequency, is used to carry out the noncontact power feeding to the power receiver.

8. The power transmitting apparatus according to claim 7, wherein
the power transmitting coil is configured to transmit an electric power wirelessly to a power reception circuit of the power receiver, the power receiver comprising a load that is configured to perform predetermined operations based on the electric power transmitted to the power reception circuit; and
the measurement circuitry is configured to measure the voltage across the resistor before the electric power is wirelessly transmitted to the power reception circuit.

9. The power transmitting apparatus according to claim 8, wherein the load is configured to charge a battery based on the electric power transmitted to the power reception circuit.

10. The power transmitting apparatus according to claim 7, wherein the controller is configured to monitor impedance based on the voltage and detect the foreign object based on the impedance.

11. The power transmitting apparatus according to claim 7, wherein the controller is configured to:
compare the voltage across the resistor with a threshold value; and
detect the foreign object based on the comparison.

12. A power transmitting system comprising:
a power transmitting apparatus and a power receiving apparatus,
wherein the power transmitting apparatus comprises:
- a resonance circuit including a power transmitting coil;
- a resistor arranged in series with the power transmitting coil;
- a power generation circuit configured to supply electric power to the resonance circuit, the power transmitting coil being configured to carry out noncontact power feeding to the power receiving apparatus through a magnetic field;
- a measurement circuitry configured to measure a voltage across the resistor periodically; and
- a controller configured to determine a presence or absence of a foreign object within a range from the power transmitting coil periodically,
wherein the noncontact power feeding to the power receiving apparatus is carried out for a predetermined period after the controller determines that the foreign object is absent within the range,
the measurement circuitry is configured to measure the voltage across the resistor after the noncontact power feeding to the power receiving apparatus is finished,
a first frequency is used to determine the presence or absence of the foreign object within the range from the power transmitting coil, and
a second frequency, different from the first frequency, is used to carry out the noncontact power feeding to the power receiving apparatus.

* * * * *